US012746622B2

(12) United States Patent
Averbeck et al.

(10) Patent No.: US 12,746,622 B2
(45) Date of Patent: Sep. 29, 2026

(54) LASER PROCESSING OF RECYCLABLE FILMS

(71) Applicant: LaserSharp FlexPak Services, LLC, Vadnais Heights, MN (US)

(72) Inventors: Justin Averbeck, North Branch, MN (US); Juan Carlos Tinoco, Woodbury, MN (US)

(73) Assignee: LaserSharp FlexPak Services, LLC, Vadnais Heights, MN (US)

( * ) Notice: Subject to any disclaimer, the term of this patent is extended or adjusted under 35 U.S.C. 154(b) by 76 days.

(21) Appl. No.: 18/386,943

(22) Filed: Nov. 3, 2023

(65) Prior Publication Data

US 2024/0149378 A1 May 9, 2024

Related U.S. Application Data

(60) Provisional application No. 63/422,785, filed on Nov. 4, 2022.

(51) Int. Cl.

| | |
|---|---|
| ***B23K 26/359*** | (2014.01) |
| ***B23K 26/00*** | (2014.01) |
| ***B23K 26/0622*** | (2014.01) |
| ***B23K 26/12*** | (2014.01) |
| *B23K 103/00* | (2006.01) |

(52) U.S. Cl.

CPC ........ *B23K 26/359* (2015.10); *B23K 26/0006* (2013.01); *B23K 26/0622* (2015.10); *B23K 26/123* (2013.01); *B23K 2103/42* (2018.08)

(58) Field of Classification Search

CPC .......................... B23K 26/364; B23K 26/359; B23K 26/0622; B23K 26/0626; B23K 26/123; B23K 26/0838

See application file for complete search history.

(56) References Cited

U.S. PATENT DOCUMENTS 7,324,867 B2 1/2008 Dinauer
7,622,366 B2 * 11/2009 Nakamura .......... H10P 72/0428 438/464
7,650,193 B2 1/2010 Aron (Continued)

FOREIGN PATENT DOCUMENTS

EP 2658716 A1 11/2013
EP 2522595 B1 1/2014

(Continued)

OTHER PUBLICATIONS

English Translation for JP 2003040285 (Year: 2003).*
International Search Report and Written Opinion, PCT Application No. PCT/US23/36801, Mailed Mar. 11, 2024, 10 pages.

*Primary Examiner* — Seyed Masoud Malekzadeh
(74) *Attorney, Agent, or Firm* — Campbell IP Law LLC

(57) ABSTRACT

A method for laser scoring a film comprising at least 90% polyolefin comprises scoring a moving web of the film by utilizing the peak pulse power of a laser at a frequency of about 20 kHz or less to create a scored film with a score feature comprising a series of non-overlapping scored spots. In another aspect, a laser scored film comprises at least 90% polyolefin; and a score feature comprising a series of laser-formed non-overlapping scored spots on the film having a cut size of between 0.15 mm and less than 0.5 mm, and a tie length between 0.15 mm and less than 0.5 mm.

17 Claims, 5 Drawing Sheets

(56) References Cited

U.S. PATENT DOCUMENTS

| | | | |
|---|---|---|---|
| 8,755,121 B2 | 6/2014 | Cape | |
| 8,765,855 B2 | 7/2014 | Thaker | |
| 8,871,424 B2 | 10/2014 | Merical | |
| 9,061,796 B2 | 6/2015 | Caldwell | |
| 9,169,052 B2 | 10/2015 | Bowers | |
| 9,174,308 B2 | 11/2015 | Chow | |
| 9,209,443 B2 | 12/2015 | L Abee | |
| 9,216,849 B2 | 12/2015 | Pham | |
| 9,845,184 B2 | 12/2017 | Bazbaz | |
| 9,926,122 B1 | 3/2018 | Branyon | |
| 9,988,194 B2 | 6/2018 | Brandl | |
| 10,010,637 B2 | 7/2018 | Kozin | |
| 10,220,472 B2 | 3/2019 | Vockrodt | |
| 10,287,078 B2 | 5/2019 | Lester | |
| 10,384,388 B2 | 8/2019 | Baldwin | |
| 10,421,588 B2 | 9/2019 | Middleton | |
| 10,633,148 B2 | 4/2020 | Chaturvedi | |
| 11,267,079 B2 * | 3/2022 | Zhou | B23K 26/60 |
| 12,306,888 B2 * | 5/2025 | Shukla | G06F 16/9535 |
| 2012/0061274 A1 | 3/2012 | Tumminello | |
| 2014/0227400 A1 | 8/2014 | Farooqui | |
| 2014/0265267 A1 | 9/2014 | O'Gara | |
| 2014/0335235 A1 | 11/2014 | Swenson | |
| 2016/0185087 A1 | 6/2016 | Kian | |
| 2017/0210513 A1 | 7/2017 | Chaturvedi | |
| 2018/0029398 A1 | 2/2018 | Franzen | |
| 2020/0384575 A1 * | 12/2020 | Zhou | B32B 27/32 |
| 2020/0384748 A1 | 12/2020 | Lackner | |
| 2021/0309434 A1 | 10/2021 | Ardpru | |
| 2021/0339930 A1 | 11/2021 | Okubo | |
| 2024/0166414 A1 * | 5/2024 | Ishimaru | B65D 33/00 |
| 2024/0217035 A1 * | 7/2024 | Zhou | A61F 13/15723 |

FOREIGN PATENT DOCUMENTS

| | | | |
|---|---|---|---|
| EP | 2925620 | A1 | 10/2015 |
| EP | 2952451 | A1 | 12/2015 |
| EP | 2599735 | B1 | 4/2016 |
| EP | 2607264 | B1 | 9/2016 |
| EP | 3149097 | A1 | 4/2017 |
| EP | 2681006 | B1 | 10/2017 |
| EP | 2197750 | B1 | 11/2017 |
| EP | 3523084 | A1 | 8/2019 |
| EP | 3452374 | B1 | 3/2020 |
| EP | 3105054 | B1 | 7/2021 |
| EP | 3849323 | A1 | 7/2021 |
| EP | 3908243 | A1 | 11/2021 |
| JP | 2003040285 | A * | 2/2003 |

* cited by examiner

LASER PROCESSING OF RECYCLABLE FILMS

PRIORITY CLAIMS

This application claims the benefit of U.S. Provisional Patent Application No. 63/422,785 filed Nov. 4, 2022, the entire contents of which are hereby incorporated by reference.

BACKGROUND

The present disclosure relates in general to laser processing of web-based materials, and more particularly, to laser processing of films for packaging.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

Governments and industries around the world are pushing for a circular economy based on the responsible and sustainable use of plastics. For example, the European Commission announced in 2022 that it established the first ever Europe-wide strategy for plastics in line with its transition toward a circular economy, with a goal that all plastic packaging in the EU market will be recyclable by 2030.

Traditionally, plastic package films comprise non-recyclable multi-material composites based on more than one type of polymer (e.g., PET, BOPP, LLDPE, etc), often in a multi-layer or laminate construction. Each layer of the film may be designed for a specific function, such as gas or oxygen barrier, water vapor barrier, oil and grease resistance, or printing or graphics. To improve the recyclability of plastic packaging, industries are pushing for the use of monomaterial or mono-polymer package films, such as films comprising all polyolefin-based resins, such as polyethylene (PE) or polypropylene (PP). Additionally, there is a desire to reduce package mass and volume through the reduction of the number of film layers used and the material thickness of those layers.

These recyclable monopolymer package films may comprise, as an example, various forms of PE, such as a layer of linear low-density PE (LLDPE) as an internal sealing layer, and a layer of machine-direction-orientation (MDO) PE as an external printing layer. Additional PE-based layers may be introduced, some with barrier coatings or additives, depending on the needs of the package.

In some cases, recyclable multilayer films may comprise a layer of PE in addition to a layer of PP, both being recyclable categories of polyolefin resins, or may otherwise contain mostly polyolefin with a minor amount of non-polyolefin based polymers or materials.

However, monopolymer or monomaterial package films present some challenges, including how to adequately process the films to introduce industry-standard features such as easy-tear openings. For example, standard multi-material package films may be laser-processed to introduce a controlled-depth quasi-continuous score line in the film formed from overlapping ablated and/or melted spots in the material, which enables a controlled tear propagation along that line when pulling on the package material to open it. An example of such laser-processing technique is described in U.S. Pat. No. 10,220,472 by Vockrodt et al., owned by the applicant of the present disclosure, and hereby incorporated by reference in its entirety. However, such quasi-continuous scoring techniques as described may not always work sufficiently with a monopolymer package film material or a film comprising predominately one polymer, such as PE, a polymer which is innately transparent to common industry-standard laser wavelengths used for scoring package film materials.

For example, in US Patent Publication No. US20200384748A1 by Lackner et al., they describe the poor laser absorption of a high-density polyethylene (HDPE) layer of a laminate package film, with attempts at laser scoring resulting in destroying the barrier properties of the packaging as well as making it more difficult to open. They then describe incorporating an ethylene vinyl acetate (EVA) based additive in the HDPE film to improve its laser adsorption, either by blending, coating or co-extrusion. However, it is not always desirable to require such an additive when designing package films.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the present disclosure relates to a method for laser scoring a recyclable film material by utilizing the peak pulse power of a laser at low frequency to create a score feature on the film material which comprises a series of non-overlapping scored spots on the film such that the film tears consistently along the score feature.

In another aspect, a method for laser scoring a film comprising at least 90% polyolefin comprises scoring a moving web of the film by utilizing the peak pulse power of a $CO_2$ laser at a frequency of about 20 kHz or less to create a scored film with a score feature comprising a series of non-overlapping scored spots.

In another aspect, a laser scored film comprises at least 90% polyolefin; and a score feature comprising a series of $CO_2$ laser-formed non-overlapping scored spots on the film having a cut size of between 0.15 mm and less than 0.5 mm, and a tie length between 0.15 mm and less than 0.5 mm.

DETAILED DESCRIPTION

Figure 1:
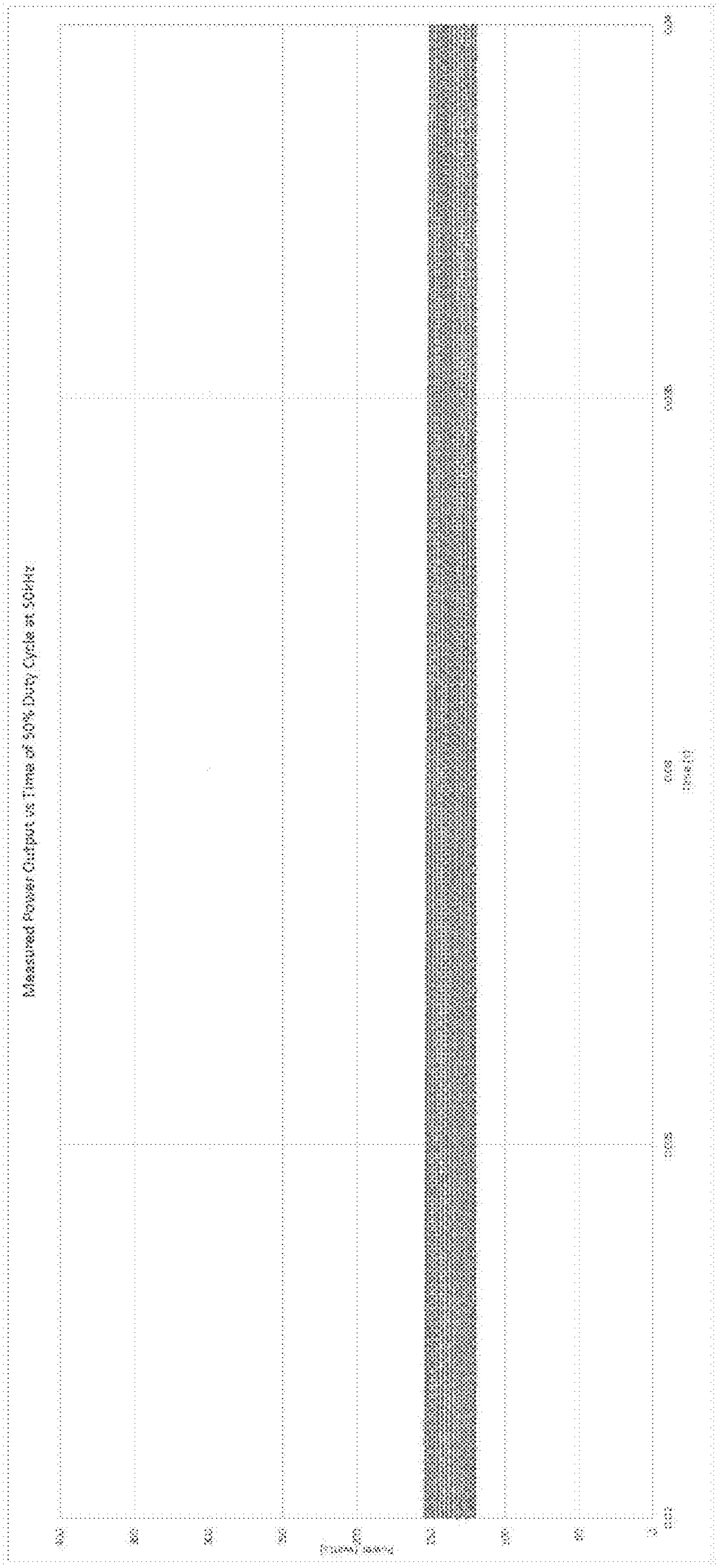
FIG. 1 is a graph showing a measured power output versus time for a laser operating at a 50 kHz frequency.

Disclosed herein is a system and method for processing recyclable package films using a laser, such as by scoring or cutting the material at a controlled depth to yield a score feature with sufficient tensile force performance for easy-tear package applications, for example. However, the systems and methods presented herein may also be used for other types of processing including but not limited to welding, etching, perforating, scribing, ablating, or kiss-cutting. Recyclable films, including flexible package films, according to the present disclosure may comprise at least 90% polyolefin resins or polymers, and alternatively, may comprise between about 90% to about 95% polyolefin, with 95% being a common standard for European regulations. Alternatively, recyclable films according to the present disclosure may also comprise 100% polyolefin resins or polymers, either in multilayer configuration wherein each layer may contain a different polyolefin resin, or in single layer configuration comprising a monopolymer. In some cases, the recyclable film may comprise minor or otherwise negligible amounts of non-polyolefin polymers, including coatings such as barrier coatings, and non-recyclable additives or materials. Examples of polyolefin resins used in recyclable films includes but is not limited to PP; PE, including high-density polyethylene (HDPE), low-density polyethylene (LDPE) and linear low-density polyethylene (LLDPE); ethylene vinyl acetate (EVA); and polyethylene butene (PB); with PE and PP being the most common.

Film's comprising a large proportion of or exclusively PE tend to be difficult to laser score due to PE's innate transparency to common wavelengths used in the industry, hence it does not readily absorb the laser energy necessary to create the controlled depth score features in the film. High power lasers that are capable of emitting wavelengths that will absorb into PE (i.e. a material matched wavelength) are expensive, and have the problem that those wavelengths also tend to be absorbed preferentially by water moisture as well. Hence, in commercial applications where water moisture is present between the laser module (emitting the laser beam) and the film substrate to be processed, some percentage of the laser energy will be absorbed by the intervening ambient moisture and not by the material. Variations in ambient humidity levels will thus create undesirable variability in the processed material itself. Although humidity control measures could be implemented in the area around the laser module and workspace, this represents an undesirable added cost, particularly in packaging which is a commoditized industry sensitive to even small cost variations. Further, adjusting the laser output to vary with the humidity, even if theoretically possible, adds undesirable complexity to operating the laser scoring module, as well as wasted energy costs due to the incomplete and inefficient transfer of energy from the laser module to the substrate when intervening moisture is present.

In order to avoid the problems stated above with expensive and complicated material-matched laser wavelengths, the inventors considered ways to adjust the operating parameters of commercially available standard wavelength lasers and methods to sufficiently score recyclable film material such as polyolefins including PE. The standard method to score standard films, such as described in U.S. Pat. No. 10,220,472 by Vockrodt et al. referenced in the Background above, is to try to achieve a quasi-continuous line in the processed material, where each pulse of the laser overlaps sufficiently enough to create overlapping ablated and/or melted (i.e. scored) spots of controlled depth on the material itself, consequently forming the general appearance and physical performance of a straight-line score (thus a "quasi" continuous line). However, as Vockrodt et al. mentions, the laser's energy density being transferred into any specified volume of material must be kept consistent at a given processing speed of that substrate moving under the laser, and that transferred energy density must be sufficient to create the controlled-depth quasi-continuous line or score at any processing speed. The inventors discovered, however, that for polyolefin materials including but not limited to PE, quasi-continuous lines were only feasible at slower process line speeds to enable the high energy density sufficient for creating the score in the inherently transparent PE material, even at high energy frequencies such as 50 kHz. Unfortunately, such processing speeds were not desirable for many typical package film commercial processes, which tend to operate at faster speeds such as at least 100 ft/min to reduce manufacturing costs.

To overcome the above issues among others, the inventors surprisingly discovered a system and method for operating commercially available lasers to create a sufficient score in recyclable polyolefin-based film materials such as PE, even at sufficient package film commercial process speeds. Rather than trying to achieve a conventional score with significantly overlapping laser pulses and spots on the material, the inventors discovered that intentionally pulsing the laser at lower frequencies while taking advantage of its inherent higher peak power could create a laser score of sufficient tensile performance even where the spots on the material did not overlap to form a quasi-continuous line. Further, this tensile performance was surprisingly improved both with respect to the tensile strength of the laser-scored film itself, which needs to be sufficient for surviving downstream converting processes in the package industry, but also with respect to end-user performance to generate a consistent and easy tear down the score feature, as will be described further herein.

Figure 2:
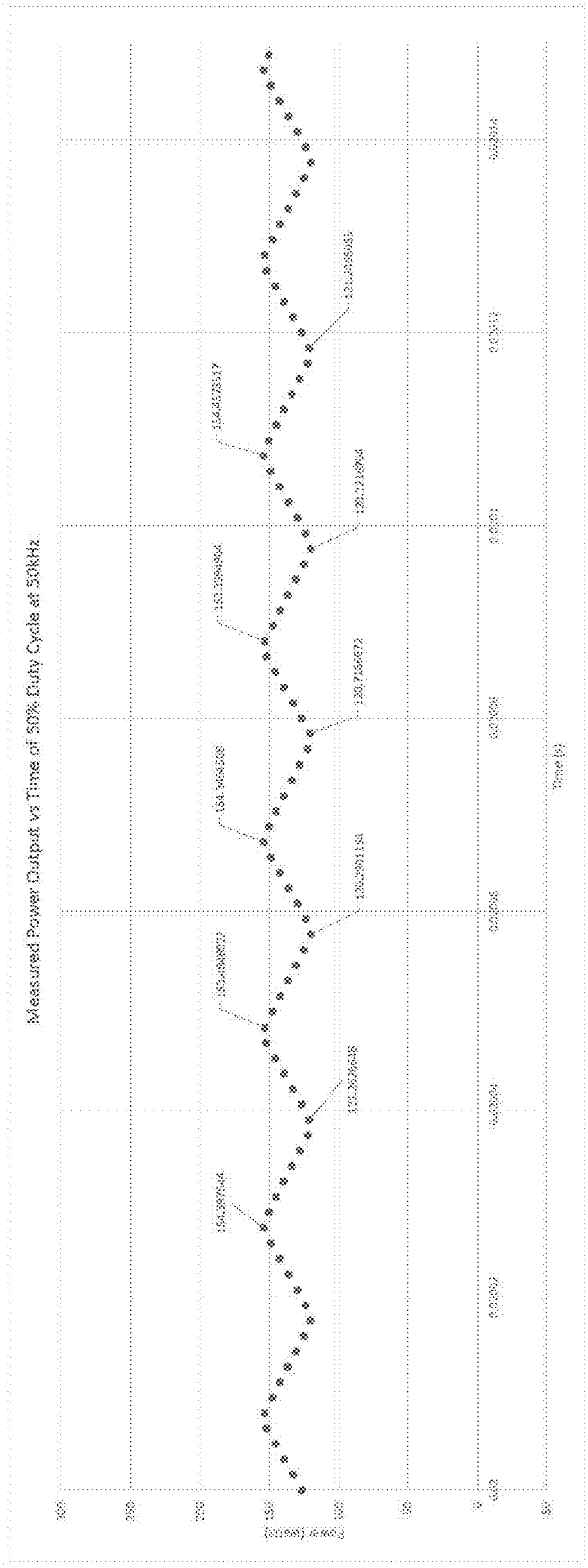
FIG. 2 is a zoomed in view of FIG. 1.

FIGS. 1 and 2 are an example of a high-frequency, quasi-continuous line method of operating a laser, showing the measured power output of the laser (y axis) as a function of time (x axis) at a given duty cycle and frequency, in this case, 50% duty cycle at 50 kHz. Duty cycle may be described by the ratio of pulse width (which is the time duration between the rising and falling edges of a pulse), to the total period of the signal (which is the time taken for it to complete one on-and-off cycle), whereas frequency is the number of laser pulses per second, potentially ranging from 0.01 to 100 kHz for a standard $CO_2$ laser. Power output is typically controlled by modulating the on/off pulsing of the laser (pulse width modulation) at high frequency and at a duty cycle to create a controlled average power output and quasi-continuous wave (and hence quasi-continuous straight line on the material) such as evident in FIG. 1. FIG. 2 shows a zoomed in view of FIG. 1 representing a much shorter time interval, and it can be seen that the minimum (trough) versus maximum (peak) of the measured power output narrowly ranges from about 120 to about 155 watts over time. This is because the laser is being pulsed at high frequency such that the falling edge of one pulse (laser turning off) is quickly overlapped by the rising edge of the next pulse (laser turning on) to create a narrow variation in power output approximating the continuous wave or band of FIG. 1. In the processed material, this in turn results in the overlapping spots of controlled depth as the pulsing of the laser ablates and/or melts the polymer material sequentially. However, as described previously, this quasi-continuous line method is only feasible for creating a sufficient score in recyclable polyolefin films at slower processing speeds, particularly with respect to PE dominant films.

Figure 3:
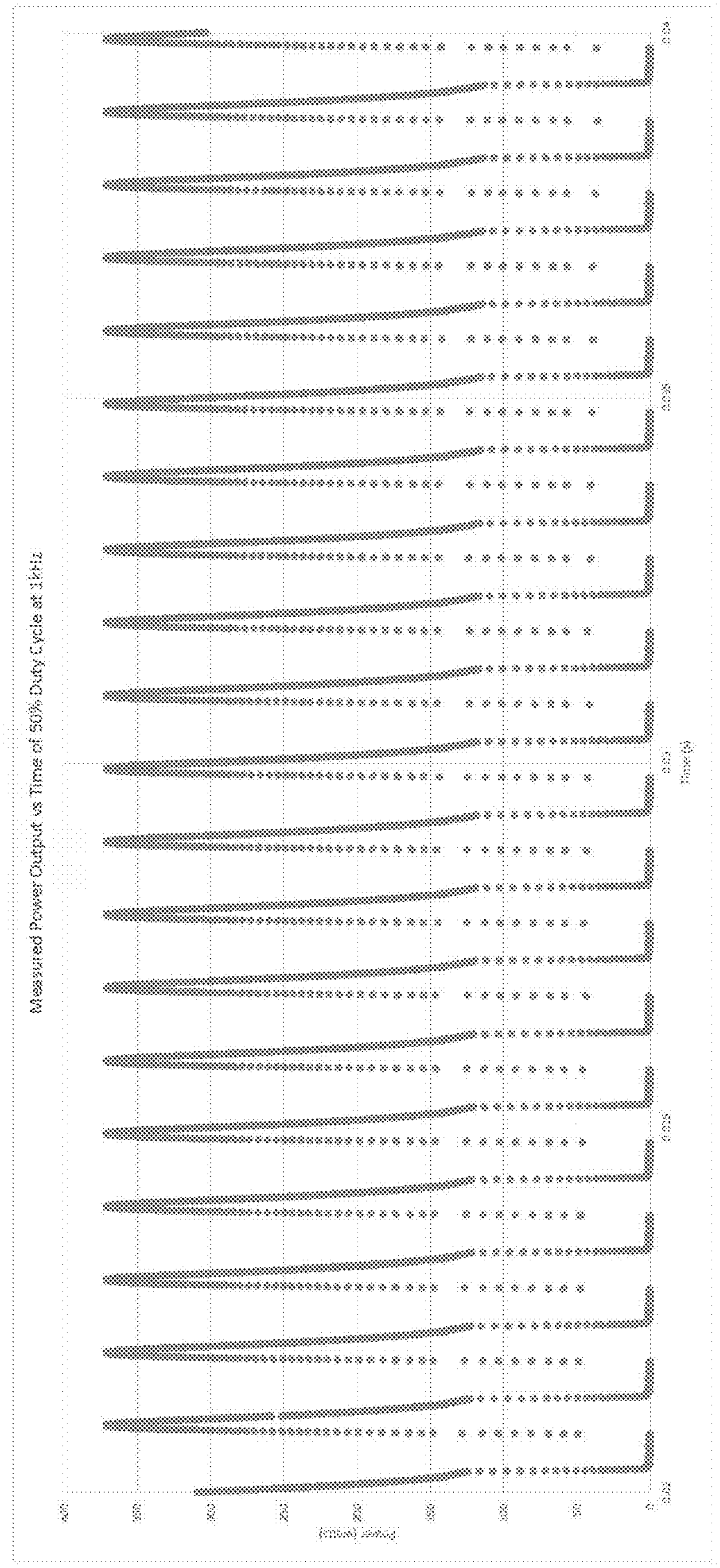
FIG. 3 is a graph showing a measured power output versus time for a laser operating at a 1 kHz frequency.

FIG. 3 shows an example of a low frequency method of operating a laser, showing measured power output as a function of the same time interval and duty cycle as FIG. 1, but at only 1 kHz. Here, the minimum (trough) versus maximum (peak) of the measured power output widely ranges from close to zero up to over 350 watts, versus the narrow 120 to 155 watts of the 50 kHz frequency laser. This is because the laser is being intentionally pulsed at low frequency such that the falling edge of one pulse (laser turning off) is not overlapped by the rising edge of the next pulse (laser turning on), hence the large variation in power output which does not at all resemble a continuous wave such as shown in FIGS. 1 and 2. In the processed material, this in turn results in spaced apart, non-overlapping spots of controlled depth as the pulsing of the laser ablates and/or melts the polymer material with each peak pulse power. It may be appreciated that if a different laser having different average working power was used, the scaling of FIG. 3 may look different between minimum and maximum measured power output, for example, but the principle of utilizing the peak pulse power would remain unchanged.

Surprisingly, it was found that when using lower frequencies, such as below 20 kHz, the peak power generated by the laser from each pulse was sufficient to create a controlled-depth score feature in the monopolymer material that performed sufficiently as measured by tensile force testing, and without forming undesirable pinholes or through-holes as described in the prior art. Lasers inherently tend to create these high peaks (such as shown in FIG. 3) whenever first turned on or activated. Typically this is undesirable when processing material because it can create pinholes due to the excess energy transferred into the material beyond the desired processing window or steady state, which may ruin the barrier properties of the package film. In contrast with the quasi-continuous line methods of operating lasers, which consider this peak power as a feature of lasers to be corrected for and averaged out via tightly overlapping pulses at high frequency, the inventors of the present disclosure were able intentionally leverage the effect of peak power to their advantage to create a controlled depth score in monopolymer material, and despite the wide power output range resulting from this method. Further, this technique was realized at commercially feasible processing speeds of about 393 ft/min up to about 656 ft/min for pure PE-based monopolymer film material, both monolayer and multilayer, and is prophetically enabled up to about 1,181 ft/min for monopolymer materials including typical process additives to improve laser absorption, as described further below. When the monopolymer films were processed at low frequencies, for example below 20 kHz, preferably from about 0.5-15 kHz, and for scanner lasers such as laser processing method 1 disclosed below, preferably from about 1-10 kHz, more preferably from about 1-8 kHz, and most preferably from about 1-4 kHz, and at commercially suitable processing speeds. Although controlled depth scores may be important for preserving the barrier aspects of certain package films, it may be appreciated that the systems and methods described herein may also be used to create perforations or through-holes through the recyclable film when barrier properties are not required, for example.

Example Recyclable Films 1

The following example recyclable monopolymer sample films of TABLE 1 were selected for laser processing.

TABLE 1

| Sample Name | Virgin Monopolymer Film | Commercial Monopolymer Film (Prophetic Example) |
|---|---|---|
| Polymer(s) | HDPE | PE |
| Construction | Single Layer | Multi-layer laminate |
| Additives | None | Laser Absorptive Substance |
| Thickness | 25.4 μm | 20-150 μm |

The Commercial Monopolymer Film (prophetic example) may comprise any kind of PE, including but not limited to HDPE, LDPE, LLDPE, as well as MDO-PE. Various combinations of PE resins may be combined, such as a layer of linear low-density PE (LLDPE) as an internal sealing layer, and a layer of machine-direction-orientation (MDO) PE as an external print layer. Additional PE-based layers may be introduced, some with barrier coatings or additives, depending on the needs of the package. Laser absorptive additives may be used as is known in the art, such as inorganic or organic substances or combinations thereof, that facilitate the absorption of laser light and energy into the polymer film. Adhesives or inks may also be present, with their own optical absorptive properties as is known in the art.

Laser Processing Method 1

Figure 4:
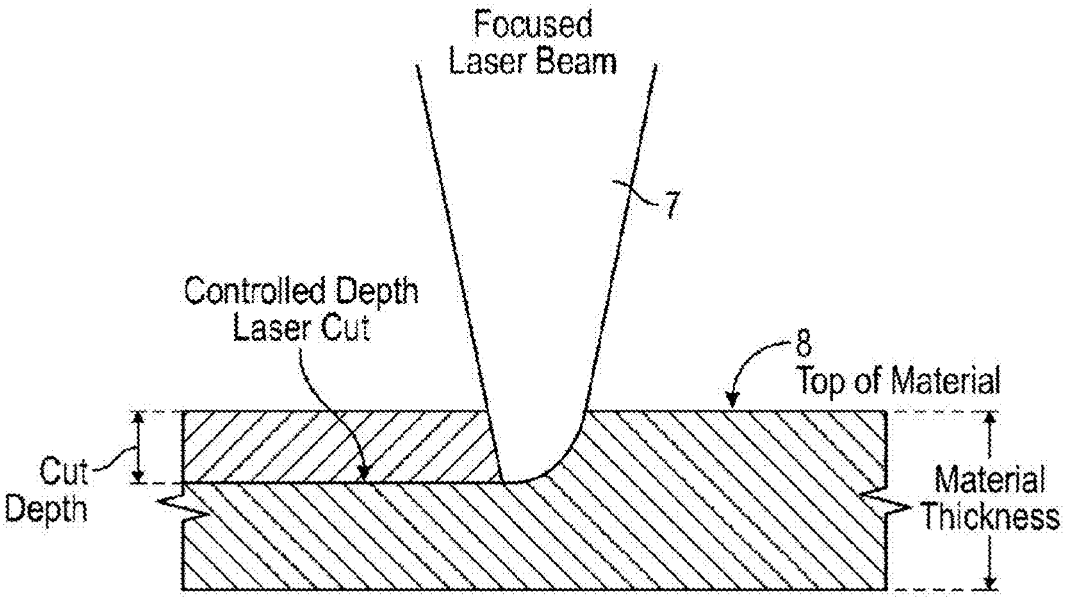
FIG. 4 is a cross sectional side view of an example of a controlled depth laser cut for creating a scored spot on a film material.

FIG. 4 shows a laser beam 7 being focused by a focusing lens, or combination of lenses, to the surface of example monopolymer sample materials 8, or near the surface of the material. The laser beam 7 does not need to be focused at the exact top of the material 8 but can be focused slightly above or below the surface of the material 8 to achieve a minimum score width per the optical design characteristics and respective power settings being used. The focused laser beam 7 is at a high enough energy density to cut, ablate or melt the material 8, as described previously, by choosing the appropriate modulation frequency, duty cycle, and processing speed according to the systems and methods of the present disclosure.

Figure 5:
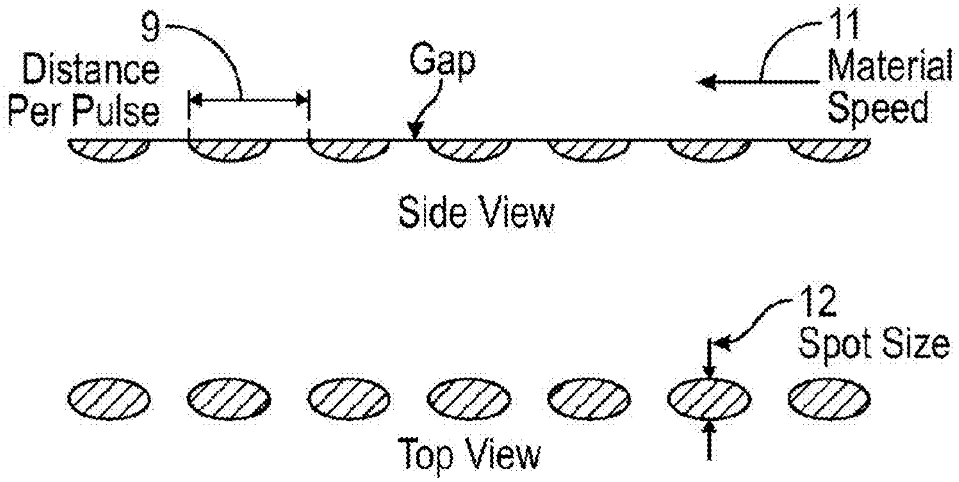
FIG. 5 is side and top view of a score feature having non-overlapping scored spots created on a film material according to the system and method of the present disclosure.

FIG. 5 shows an example side view and top view of scored spots on the monopolymer sample film materials 8, where the peak pulse power and non-overlapping or mostly non-overlapping pulses generated at, for example, about 1-15 kHz, created non-overlapping spots on the film, such that there was a gap between each spot corresponding to the distance per pulse 9. The size of each spot or cut versus the gap between them may be referred to as the cut/tie ratio, and may be controlled using the systems and methods of the present disclosure. Preferably, the cut size may comprise about 0.5 mm to about 0.15 mm and the tie length may comprise between about 0.5 mm to about 0.15 mm, for example. Note the spot size 12 is assumed circular in shape however it may become elongated, as shown in FIG. 3, due to increasing processing speeds 11. Further, the laser will create a heat-affected zone of slightly melted plastic that encircles the circumference of the scored spot feature, but this heat affected zone is not considered part of the laser cut spot. Thus, non-overlapping spots according to the present disclosure may include a situation where heat affected zones are touching or overlapping in the score feature, but each laser cut is not overlapping or touching. In the case of an oblong laser cut, the cut size is measured in the direction of the score feature. Further, the tie length does not measure between heat affected zones, but measures between the distal edge of one cut to the leading or proximal edge of the next cut in the score feature. Note, FIG. 5 does not show heat affected zones, just the laser cuts themselves. Although the non-overlapping situation shown in FIG. 5 would normally be considered undesirable from the perspective of high frequency quasi-continuous line processing as described previously, it was surprisingly discovered that when the monopolymer films were processed at low frequencies, for example below 20 kHz, preferably from about 1-15 kHz, preferably from about 1-10 kHz, more preferably from about 1-8 kHz, and most preferably from about 1-4 kHz, and at commercially suitable processing speeds (11 in FIG. 5) of about 2000 mm/s or 393 ft/min for the Virgin Monopolymer Film samples and at about 6000 mm/s for the Commercial Monopolymer Film samples (Prophetic), the films still exhibited sufficient tear characteristics along the score feature as measured by direct observation and tearing by hand, as well as quantified by tensile force tests described further below.

Although any suitable laser capable of the desired frequencies could be used, the present monopolymer sample materials were processed with a first laser comprising a continuous wave (CW) $CO_2$ laser capable of peak power pulsing, and compared to a second laser comprising a CW $CO_2$ laser optimized for higher peak power pulsing than the first laser, both 100 watt model lasers, and having a laser wavelength of 10.25 μm, processing field of view of 70 mm, focal length of 120 mm, and using a 14 mm aperture scan head. Since this test included cross-web scoring, scanner or galvanometer-type lasers were used to direct the laser path across the web in addition to down the web or in the machine direction, in contrast to the fixed position laser described with reference to Laser Processing Method 2 described further below.

The Virgin Monopolymer Film was laser scored in both the cross-web and machine direction at varying frequencies between 1-8 kHz or between 1-10 kHz respectively by both the first and second lasers for comparison. Both lasers were run with at a material processing speed of 2000 mm/s or 393 ft/min, max DC of 100%, but the first laser was run at 45% power (i.e. duty cycle) and second laser at 50% power (i.e. duty cycle). To produce the scored samples of film, a line 50 mm long was drawn in laser CAD in cross-web or machine direction. The laser repeat of the lasered part was set at 50 mm for machine direction line and 150 mm for cross-web line in order to get samples that could be cut and pulled for tensile testing.

An Olympus BX51 Optical Microscope with 2.5×-5.0×-10.0×-25.0× magnification was used to view the characteristics of the scored spots on the laser processed sample films to visually confirm the score cuts were non-overlapping.

Results 1

The Tensile Test Method was performed as follows. Tensile force of the scored Virgin Monopolymer Films was measured using a Test Resources Model 100P250-6 Serial: 0912019-01A with a Force Transducer Model SM-50-294 Serial: 673314. The test method was similar to ASTM D882, but carried out as follows. Laser scored sample materials were cut into 1-inch strips positioning the laser score running perpendicular to the strip. Test strips were mounted into the jaws of the tensile machine so the laser score was perpendicular to the direction of pull and centered between the jaws. The strip was pulled at 2 inches/min (no more than 5 inches/min), and the maximum load on the force transducer resulting in the sample breaking was recorded as the tensile value in lbs-f/inch.

Figure 6A:
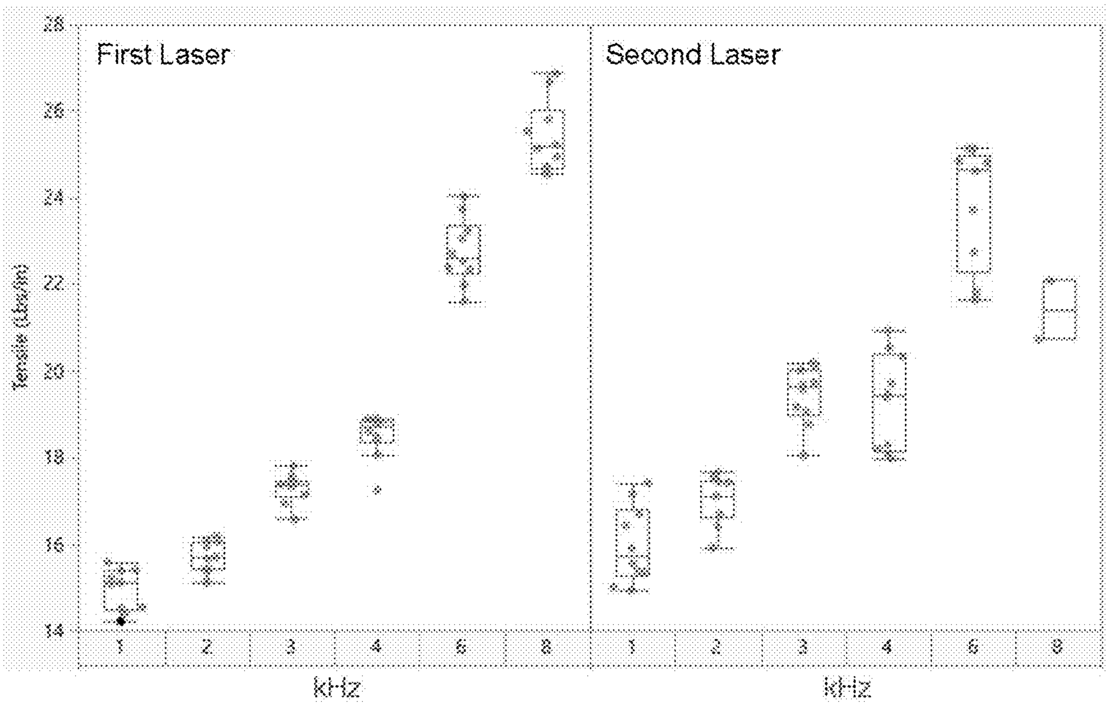
FIGS. 6A and 6B are graphs showing the tensile force results of films processed by lasers in the cross-web and machine direction orientations (respectively) according to the system and method of the present disclosure.
Figure 6B:
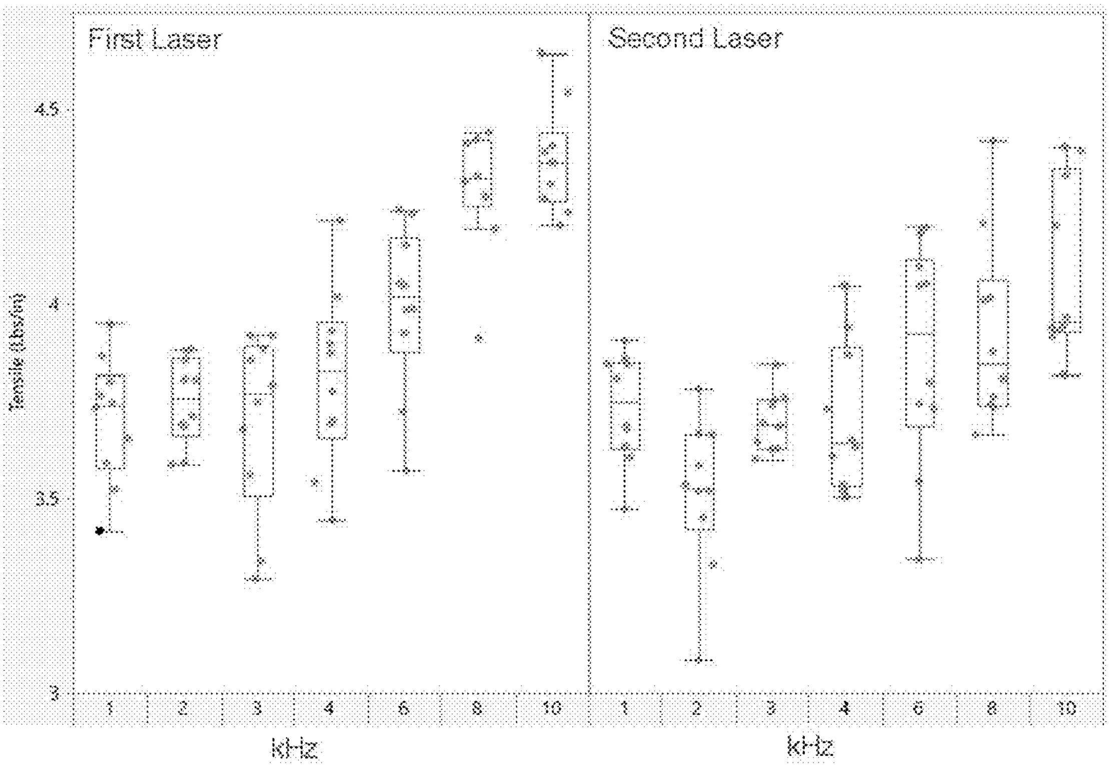

The results of the tensile testing of the laser scored Virgin Monopolymer Film samples across frequencies of 1-8 kHz are provided in TABLE 2A (first laser) and TABLE 2B (second laser) for the crossweb scoring, which is also shown in FIG. 6A. The results of the tensile testing for the machine direction (MD) scoring of the samples across frequencies of 1-10 kHz are provided in TABLE 3A (first laser) and TABLE 3B (second laser), which is also shown in FIG. 6B, with tensile values measured in lbs-f/inch for all samples M1-M10. Further, the minimum (min), maximum (max), average, and standard deviation (Stdev) values are indicated or calculated for the multiple samples M1-M10 for each frequency tested, as well as a % of raw which is the average tensile strength as a percentage of the original tensile strength for the raw, unprocessed version of the film from which the samples were made. The % of raw is a simple way to understand the loss in tensile strength resulting from the laser scored features, with a higher % meaning less loss. Too much of a reduction in tensile strength could cause issues in the downstream processing or converting of the film, resulting in the film tearing apart when subjected to standard web tensions or otherwise. In contrast, too much tensile strength in some cases may hinder the controlled tear propagation along the score feature when being pulled apart by a user of a resulting package film. A % of raw of at least at least about 55% is optimal, but if less than 55%, then laser scored films having a standard tensile strength of at least 10 lbs-f/in are considered to still be suitable for future manufacturing processes, i.e. downstream converting.

TABLE 2A

First Laser - Crossweb Scoring

| | Frequency kHz | | | | | |
|---|---|---|---|---|---|---|
| Sample # | 1 | 2 | 3 | 4 | 6 | 8 |
| M1 | 14.2 | 15.4 | 17.4 | 18.8 | 23.7 | 25.2 |
| M2 | 15.2 | 15.4 | 17.3 | 18.4 | 23.1 | 25.5 |
| M3 | 14.5 | 15.1 | 16.9 | 18.5 | 22.7 | 26.7 |
| M4 | 14.5 | 15.7 | 17.8 | 18.8 | 22.5 | 26.9 |
| M5 | 14.4 | 15.7 | 17.4 | 18.9 | 24.0 | 25.8 |
| M6 | 15.1 | 15.9 | 17.4 | 18.6 | 22.4 | 24.6 |
| M7 | 15.4 | 15.4 | 16.6 | 18.1 | 23.2 | 24.5 |
| M8 | 15.1 | 16.1 | 17.4 | 17.2 | 22.0 | 24.7 |
| M9 | 15.4 | 16.2 | 17.1 | 18.9 | 21.6 | 24.9 |
| M10 | 15.6 | 16.1 | 17.6 | 18.8 | 22.3 | 25.1 |
| Min | 14.2 | 15.1 | 16.6 | 17.2 | 21.6 | 24.5 |
| Max | 15.6 | 16.2 | 17.8 | 18.9 | 24.0 | 26.9 |
| Average | 14.9 | 15.7 | 17.3 | 18.5 | 22.8 | 25.4 |
| Stdev | 0.5 | 0.4 | 0.3 | 0.5 | 0.8 | 0.8 |
| % of Raw | 58.8 | 61.8 | 68.1 | 72.8 | 89.6 | 100.0 |

TABLE 2B

Second Laser - Crossweb Scoring

| | Frequency kHz | | | | | |
|---|---|---|---|---|---|---|
| Sample # | 1 | 2 | 3 | 4 | 6 | 8 |
| M1 | 15.0 | 16.4 | 19.7 | 19.5 | 25.1 | xx |
| M2 | 15.5 | 15.9 | 19.6 | 20.5 | xx | 23.9 |
| M3 | 16.7 | 17.4 | 18.0 | 19.4 | 24.8 | xx |
| M4 | 17.2 | 17.5 | 20.0 | 20.9 | 24.6 | xx |
| M5 | 16.4 | 17.7 | 19.1 | 20.3 | 25.1 | xx |
| M6 | 17.4 | 17.1 | 20.2 | 19.7 | 24.8 | xx |
| M7 | 14.9 | 16.7 | 20.1 | 18.1 | 21.8 | 22.1 |
| M8 | 15.4 | 17.4 | 19.7 | 18.2 | 23.7 | 20.7 |
| M9 | 15.3 | 17.1 | 18.8 | 18.0 | 22.7 | xx |
| M10 | 15.9 | 16.7 | 19.2 | 18.3 | 21.6 | xx |

TABLE 2B-continued

Second Laser - Crossweb Scoring

| Sample # | Frequency kHz 1 | 2 | 3 | 4 | 6 | 8 |
|---|---|---|---|---|---|---|
| Min | 14.9 | 15.9 | 18.0 | 18.0 | 21.6 | 20.7 |
| Max | 17.4 | 17.7 | 20.2 | 20.9 | 25.1 | 23.9 |
| Average | 16.0 | 17.0 | 19.4 | 19.3 | 23.8 | 22.2 |
| Stdev | 0.9 | 0.6 | 0.7 | 1.1 | 1.4 | 1.6 |
| % of Raw | 67.1 | 71.3 | 81.6 | 81.0 | 100.0 | 93.3 |

TABLE 3A

First Laser - Machine Direction Scoring

| Sample # | Frequency kHz 1 | 2 | 3 | 4 | 6 | 8 | 10 |
|---|---|---|---|---|---|---|---|
| M1 | 3.4 | 3.6 | 3.9 | 3.9 | 4.0 | 4.4 | 4.2 |
| M2 | 3.7 | 3.7 | 3.8 | 4.0 | 4.0 | 4.4 | 4.3 |
| M3 | 3.6 | 3.9 | 3.3 | 3.9 | 3.6 | 4.2 | 4.3 |
| M4 | 3.9 | 3.9 | 3.9 | 3.4 | 4.2 | 3.9 | 4.2 |
| M5 | 3.5 | 3.7 | 3.8 | 3.5 | 3.9 | 4.4 | 4.4 |
| M6 | 3.7 | 3.8 | 3.6 | 3.9 | 4.0 | 4.3 | 4.4 |
| M7 | 3.8 | 3.6 | 3.9 | 3.7 | 3.7 | 4.3 | 4.4 |
| M8 | 3.8 | 3.7 | 3.7 | 3.7 | 4.2 | 4.3 | 4.4 |
| M9 | 3.9 | 3.8 | 3.9 | 3.8 | 4.2 | 4.3 | 4.5 |
| M10 | 3.7 | 3.9 | 3.3 | 4.2 | 4.1 | 4.4 | 4.6 |
| Min | 3.4 | 3.6 | 3.3 | 3.4 | 3.6 | 3.9 | 4.2 |
| Max | 3.9 | 3.9 | 3.9 | 4.2 | 4.2 | 4.4 | 4.6 |
| Average | 3.7 | 3.8 | 3.7 | 3.8 | 4.0 | 4.3 | 4.4 |
| Stdev | 0.2 | 0.1 | 0.2 | 0.2 | 0.2 | 0.2 | 0.1 |
| % of Raw | 84.7 | 85.7 | 84.6 | 87.1 | 91.3 | 98.3 | 100.0 |

TABLE 3B

Second Laser - Machine Direction Scoring

| Sample # | Frequency kHz 1 | 2 | 3 | 4 | 6 | 8 | 10 |
|---|---|---|---|---|---|---|---|
| M1 | 3.8 | 3.5 | 3.7 | 3.7 | 4.2 | 3.7 | 4.4 |
| M2 | 3.6 | 3.7 | 3.6 | 3.6 | 4.0 | 3.8 | 3.9 |
| M3 | 3.7 | 3.6 | 3.8 | 3.9 | 3.3 | 3.9 | 4.0 |
| M4 | 3.7 | 3.1 | 3.7 | 3.7 | 4.1 | 3.7 | 3.9 |
| M5 | 3.5 | 3.5 | 3.8 | 3.5 | 3.7 | 4.2 | 4.4 |
| M6 | 3.6 | 3.3 | 3.8 | 4.0 | 4.1 | 3.8 | 3.8 |
| M7 | 3.9 | 3.5 | 3.6 | 3.9 | 3.7 | 3.7 | 3.9 |
| M8 | 3.8 | 3.8 | 3.7 | 3.6 | 3.5 | 4.0 | 3.9 |
| M9 | 3.9 | 3.7 | 3.6 | 3.5 | 3.8 | 4.4 | 4.3 |
| M10 | 3.8 | 3.5 | 3.6 | 3.5 | 4.2 | 4.0 | 4.2 |
| Min | 3.5 | 3.1 | 3.6 | 3.5 | 3.3 | 3.7 | 3.8 |
| Max | 3.9 | 3.8 | 3.8 | 4.0 | 4.2 | 4.4 | 4.4 |
| Average | 3.7 | 3.5 | 3.7 | 3.7 | 3.9 | 3.9 | 4.1 |
| Stdev | 0.1 | 0.2 | 0.1 | 0.2 | 0.3 | 0.2 | 0.2 |
| % of Raw | 91.4 | 86.0 | 90.5 | 90.7 | 94.8 | 96.1 | 100.0 |

As can be appreciated from the results, tensile force needed to tear apart the score in the Virgin Monopolymer Films surprisingly increased with frequency, particularly in the machine direction orientation. Frequencies above 10 kHz did not properly break or tear on the tensile test machine. However, Commercial Monopolymer Films (Prophetic) may break or tear at frequencies up to about 15 to less than 20 kHz in the machine direction orientation due to the present of additives and other features previous described with reference to TABLE 1. Further, it can be seen that the tensile % of raw for the crossweb scored samples was generally lower than for the machine direction with respect to the first laser, except at the higher frequencies, whereas the second laser produced cross-web samples having higher % of raw values across all frequencies. In other words, the second laser produced crossweb scored film samples having overall higher tensile strength across the frequencies tested. In contrast, machine direction scoring comparatively resulted in higher % of raw values at the lowest frequencies of 1 and 2 kHz when compared with crossweb scoring for either laser, but the difference in % of raw values was much smaller at 3 kHz or above, i.e. the results became more comparable whether using crossweb or machine direction for either laser. Lastly, the second laser produced machine direction samples having higher % of raw values across almost all frequencies except for 8 and 10 kHz. Ultimately, all of the results showed acceptable standard tensile values exceeding 55% of raw, or being above 10 lbs-f/in.

Further, these films were torn by hand in the same manner as an easy-tear opening in packaging, and in the machine-direction orientation were observed to tear appropriately along the score feature for the 1-10 kHz laser processed Virgin Monopolymer Film, and are expected to tear up to 15 kHz for the Commercial Monopolymer Film (Prophetic). A small initiative tear notch was placed in line with the laser score and the film was torn using a push and pull technique where one side of the material was pulled towards oneself and the other was pushed away. The subjective quality of the laser score was measured on the perceived amount of force taken to cause the two parts of the sample to separate from each other as well as whether the film continued to tear along the laser score in a controlled manner without veering off track, etc. In addition, due to the stretchy nature of most PE films, the tearability was judged on whether the edges of the torn sample were "gummy" causing an amount of film to stretch between the segments of the torn sample. Ultimately, these results along with the tensile tear strengths observed in both the crossweb and machine direction, and across frequencies 1-10 kHz, indicate that the methods of the present disclosure can successfully laser score recyclable films, including difficult monopolymer films comprising laser transmissive PE, to create score features that may meet a wide range of end-use specifications requiring a balance of sufficient tensile strength (e.g., meeting downstream converting requirements) and tearability along the score feature (e.g., meeting end-user requirements).

In TABLE 4 below, the local maximum (peak) and minimum (trough) measured power of the second laser, as an example, is shown for frequencies ranging between 1 and 100 kHz, including the power difference between that maximum and minimum (controlled for duty cycle and other variables). Anything between about 20 to 100 kHz is typically considered a straight-line score or quasi-continuous wave at less than 100% power or duty cycle. Averages were taken by measuring 5 consecutive peaks and 5 troughs for each frequency.

TABLE 4

| Frequency (kHz) | Power Difference (watts) | Local Maximum (watts) | Local Minimum (watts) |
|---|---|---|---|
| 1 | 370.8 | 370.9 | 0.1 |
| 3 | 309.4 | 309.8 | 0.4 |
| 5 | 292.1 | 293.0 | 0.9 |
| 8 | 236.0 | 260.4 | 24.4 |
| 10 | 196.0 | 239.0 | 43.0 |
| 13 | 158.9 | 220.8 | 61.9 |
| 15 | 135.2 | 209.3 | 74.1 |
| 18 | 110.6 | 196.4 | 85.8 |

TABLE 4-continued

| Frequency (kHz) | Power Difference (watts) | Local Maximum (watts) | Local Minimum (watts) |
|---|---|---|---|
| 20 | 96.6 | 189.3 | 92.7 |
| 25 | 79.0 | 181.0 | 101.9 |
| 50 | 33.3 | 154.0 | 120.7 |
| 75 | 19.9 | 144.4 | 124.5 |
| 100 | 13.4 | 138.6 | 125.3 |

Accordingly, using the technique of the present disclosure to take advantage of the laser pulse peak power and non-overlapping or substantially non-overlapping pulses as described, controlling the laser to have a suitable average power difference (measured from peak of laser power to trough) to achieve good laser scoring of recyclable films may comprise anything equal to or more than about 135 watts for Laser Processing Method 1, as well as Laser Processing Method 2 described further below.

Example Recyclable Films 2

A 150 μm thick multilayer laminate PE film was tested comprising a 25 μm top or "print" layer which is made of optically clear, printable and glueable PE, and a 125 μm sealant layer which is also PE, the film containing no laser absorptive additives.

Laser Processing Method 2

In contrast with the galvanometer or scanner-based lasers described with reference to Laser Processing Method 1, which redirects the laser beam with mirrors to score a moving web of film in either the crossweb or machine direction, a stationary or position-based laser was used for the present processing method 2 involving pulsing the stationary laser while the web moved underneath to create machine direction score features. The fixed position laser used was a CW $CO_2$ laser optimized for high peak power pulsing, 100 watt model, having a laser wavelength of 10.25 μm and focal length of 63.5 mm. The laser power was adjusted to match web speeds, rather than using a galvanometer mirror to match the speeds. The laser beam can be optically focused to 50-100 μm or smaller, and the smaller the focused beam the faster web speeds that can be processed. To score the sample multilayer PE recyclable film to produce the measured tensile results discussed further below, the power setting was adjusted from 200-400% as based on a maximum system speed of 600 m/min, and the fixed position laser output was frequency pulsed as described previously with reference to Laser Processing Method 1 to create the laser score pattern, ranging from a straight quasi-continuous line, i.e. a "straight line" (for the comparative examples) to the multiple non-overlapping dotted score features having varying cut×tie lengths shown in TABLES 5A-5E, and such as described with reference to FIG. 5 above of the present disclosure. The web was moved at a fixed speed of 100 ft/min using the cut and tie pattern outlined in TABLES 5B-5E and produced using a frequency referred to as "laser frequency tested". Using the laser settings outlined in each column of Tables 5A-5E and using a 100 watt $CO_2$ laser, the laser would achieve 100% operating power at the "max web speed" and would use the "max frequency at max web speed" in each column to achieve the outlined laser pattern from each Table.

An Olympus BX51 Optical Microscope with 2.5×-5.0×-10.0×-25.0× magnification was used to view the characteristics of the scored spots on the laser processed sample films materials to visually confirm the score cuts were non-overlapping for all films produced by the methods of TABLES 5B-5E.

Results 2

The Tensile Test Method was performed on each sample according to ASTM D882 in the same manner and with the same apparatus as described with reference to Results 1 of the present disclosure, using 1 inch sample film strip widths and a pull rate of 5 in/min.

Additionally, a Trouser Tear Tensile Method was performed according to ASTM D1938 with 1 inch sample film strip width, a modified pull rate of 12 in/min and using the same tensile apparatus as the Tensile Test Method to measure laser scored film samples. In contrast with the Tensile Test Method, which can indicate suitable tensile strength of the scored film such as for surviving downstream converting applications and web tensions as described previously, the Trouser Tear Method is useful for determining the ease in which a laser score can be torn, such as by an end user, with the lower the resistance the better. However, an optimally performing film will have a suitable balance between sufficient tensile strength according to the Tensile Test Method, and easy tearability in a controlled manner along the score feature, which can be assessed with the Trouser Tear Method.

TABLE 5A

| Straight Line (overlapping score spots) - Comparative Example | | | | | | | | |
|---|---|---|---|---|---|---|---|---|
| Laser Power Setting (%) | | 400 | 350 | 300 | 250 | 237.5 | 225 | 200 |
| Max Web Speed (ft/min) | | 492 | 562 | 656 | 787 | 829 | 875 | 984 |
| Laser Frequency Tested (kHz) | | 40 | 40 | 40 | 40 | 40 | 40 | 40 |
| Max Freq. at Max Web Speed (kHz) | | 40 | 40 | 40 | 40 | 40 | 40 | 40 |
| Standard | M1 | 0.00 | 5.80 | 10.16 | 11.83 | 12.10 | 12.01 | 12.42 |
| Tensile | M2 | 6.37 | 6.86 | 10.06 | 11.50 | 11.96 | 12.01 | 12.47 |
| (lbs-f/in) | M3 | 4.50 | 6.97 | 10.03 | 11.72 | 11.81 | 11.84 | 12.29 |
| | M4 | 6.44 | 6.17 | 10.08 | 11.73 | 12.08 | 11.82 | 12.31 |
| | M5 | 6.72 | 6.80 | 9.98 | 11.76 | 11.81 | 11.83 | 12.32 |
| | M6 | 6.53 | 7.23 | 9.99 | 11.48 | 12.11 | 11.67 | 12.16 |
| | M7 | 6.46 | 6.89 | 10.14 | 11.57 | 12.07 | 12.00 | 12.44 |
| | M8 | 5.97 | 8.38 | 10.53 | 11.52 | 12.06 | 12.19 | 12.27 |
| | M9 | 6.15 | 7.22 | 10.44 | 11.91 | 11.77 | 11.77 | 12.13 |
| | M10 | 4.35 | 6.35 | 10.55 | 11.53 | 11.94 | 11.71 | 12.13 |
| | Min | 0.00 | 5.80 | 9.98 | 11.48 | 11.77 | 11.67 | 12.13 |
| | Max | 6.72 | 8.38 | 10.55 | 11.91 | 12.11 | 12.19 | 12.47 |
| | Average | 5.35 | 6.87 | 10.20 | 11.65 | 11.97 | 11.88 | 12.29 |
| | StDev | 2.06 | 0.70 | 0.22 | 0.15 | 0.13 | 0.16 | 0.13 |

TABLE 5A-continued

| Straight Line (overlapping score spots) - Comparative Example | | | | | | | | |
|---|---|---|---|---|---|---|---|---|
| Tensile % of Raw Film | | 40.7 | 40.74 | 52.31 | 77.67 | 88.77 | 91.19 | 90.53 |
| Trouser | M1 | 0.33 | 0.18 | 0.26 | 1.22 | 1.01 | x | x |
| Tear | M2 | 0.35 | 0.18 | 0.28 | 1.03 | 1.06 | x | x |
| Tensile | M3 | 0.41 | 0.17 | 0.28 | 1.02 | 0.66 | x | x |
| (lbs-f) | M4 | 0.45 | 0.18 | 0.26 | 0.84 | 0.93 | x | x |
| | M5 | 0.46 | 0.18 | 0.28 | 1.43 | 0.81 | x | x |
| | M6 | 0.42 | 0.18 | 0.77 | 2.03 | 1.37 | x | x |
| | M7 | 0.45 | 0.17 | 0.29 | 1.19 | 0.97 | x | x |
| | M8 | 0.45 | 0.16 | 0.28 | 3.00 | 0.65 | x | x |
| | M9 | 0.43 | 0.16 | 0.26 | 4.24 | 1.26 | x | x |
| | M10 | 0.44 | 0.17 | 0.26 | 0.59 | 1.09 | x | x |
| | Min | 0.33 | 0.16 | 0.26 | 0.59 | 0.65 | x | x |
| | Max | 0.46 | 0.18 | 0.77 | 4.24 | 1.37 | x | x |
| | Average | 0.42 | 0.17 | 0.32 | 1.66 | 0.98 | x | x |
| | StDev | 0.04 | 0.01 | 0.16 | 1.14 | 0.23 | x | x |

TABLE 5B

| Frequency Score (cut × tie = 0.5 mm × 0.5 mm) | | | | | | | |
|---|---|---|---|---|---|---|---|
| Laser Power Setting (%) | | 400 | 300 | 275 | 250 | 225 | 200 |
| Max Web Speed (ft/min) | | 492 | 656 | 716 | 787 | 875 | 984 |
| Laser Frequency Tested (kHz) | | 0.51 | 0.51 | 0.51 | 0.51 | 0.51 | 0.51 |
| Max Freq. at Max Web Speed (kHz) | | 2.5 | 3.3 | 3.6 | 4.0 | 4.4 | 5.0 |
| Standard | M1 | 12.94 | 11.93 | 11.93 | 12.58 | 12.67 | 12.39 |
| Tensile | M2 | 12.70 | 11.87 | 12.09 | 12.39 | 12.47 | 12.52 |
| (lbs-f/in) | M3 | 12.82 | 11.77 | 11.89 | 12.32 | 12.55 | 12.47 |
| | M4 | 12.43 | 11.94 | 12.11 | 12.44 | 12.35 | 12.35 |
| | M5 | 12.54 | 12.05 | 12.24 | 12.38 | 12.62 | 12.43 |
| | M6 | 12.54 | 11.90 | 11.94 | 12.07 | 12.58 | 12.40 |
| | M7 | 12.60 | 11.76 | 12.02 | 11.99 | 12.54 | 12.54 |
| | M8 | 12.60 | 11.84 | 11.89 | 12.22 | 12.58 | 12.49 |
| | M9 | 12.18 | 11.93 | 11.90 | 12.42 | 12.47 | 12.52 |
| | M10 | 12.21 | 11.81 | 11.96 | 12.37 | 12.38 | 12.61 |
| | Min | 12.18 | 11.76 | 11.89 | 11.99 | 12.35 | 12.35 |
| | Max | 12.94 | 12.05 | 12.24 | 12.58 | 12.67 | 12.61 |
| | Average | 12.56 | 11.88 | 12.00 | 12.32 | 12.52 | 12.47 |
| | StDev | 0.24 | 0.09 | 0.12 | 0.18 | 0.10 | 0.08 |
| Tensile % of Raw Film | | 95.6 | 95.65 | 90.49 | 91.37 | 93.82 | 95.37 |
| Trouser | M1 | 0.54 | 0.87 | x | x | x | x |
| Tear | M2 | 0.73 | 1.41 | x | x | x | x |
| Tensile | M3 | 0.67 | 0.82 | x | x | x | x |
| (lbs-f) | M4 | 0.64 | 0.98 | x | x | x | x |
| | M5 | 0.80 | 0.92 | x | x | x | x |
| | M6 | 0.83 | 0.83 | x | x | x | x |
| | M7 | 1.37 | 0.84 | x | x | x | x |
| | M8 | 1.23 | 0.86 | x | x | x | x |
| | M9 | 0.65 | 0.89 | x | x | x | x |
| | M10 | 0.61 | 0.83 | x | x | x | x |
| | Min | 0.54 | 0.82 | x | x | x | x |
| | Max | 1.37 | 1.41 | x | x | x | x |
| | Average | 0.81 | 0.92 | x | x | x | x |
| | StDev | 0.27 | 0.18 | x | x | x | x |

TABLE 5C

| Frequency Score (cut × tie = 0.3 mm × 0.3 mm) | | | | | | |
|---|---|---|---|---|---|---|
| Laser Power Setting (%) | | 400 | 300 | 275 | 250 | 225 |
| Max Web Speed (ft/min) | | 492 | 656 | 716 | 787 | 875 |
| Laser Frequency Tested (kHz) | | 0.85 | 0.85 | 0.85 | 0.85 | 0.85 |
| Max Freq. at Max Web Speed (kHz) | | 4.2 | 5.6 | 6.1 | 6.7 | 7.4 |
| Standard | M1 | 11.38 | 12.00 | 11.80 | 12.09 | 12.41 |
| Tensile | M2 | 11.47 | 11.88 | 11.81 | 11.86 | 12.61 |
| (lbs-f/in) | M3 | 11.65 | 12.13 | 11.97 | 12.14 | 12.30 |
| | M4 | 11.69 | 12.10 | 11.72 | 12.16 | 12.52 |
| | M5 | 11.55 | 12.14 | 11.68 | 12.01 | 12.36 |
| | M6 | 11.64 | 11.94 | 11.75 | 12.07 | 12.64 |
| | M7 | 11.74 | 12.02 | 11.86 | 12.06 | 12.70 |

TABLE 5C-continued

| Frequency Score (cut × tie = 0.3 mm × 0.3 mm) | | | | | | |
|---|---|---|---|---|---|---|
| | M8 | 11.64 | 12.24 | 11.96 | 11.97 | 12.58 |
| | M9 | 11.67 | 12.06 | 11.89 | 12.04 | 12.47 |
| | M10 | 11.43 | 11.93 | 11.51 | 11.93 | 12.51 |
| | Min | 11.38 | 11.88 | 11.51 | 11.86 | 12.30 |
| | Max | 11.74 | 12.24 | 11.97 | 12.16 | 12.70 |
| | Average | 11.59 | 12.05 | 11.80 | 12.03 | 12.51 |
| | StDev | 0.12 | 0.11 | 0.14 | 0.09 | 0.13 |
| Tensile % of Raw Film | | 88.3 | 88.26 | 91.75 | 89.85 | 91.65 |
| Trouser | M1 | 0.44 | 0.80 | 3.02 | 2.03 | x |
| Tear | M2 | 0.42 | 0.76 | 1.97 | 1.66 | x |
| Tensile | M3 | 0.51 | 0.74 | 2.89 | 1.36 | x |
| (lbs-f) | M4 | 0.57 | 0.68 | 2.95 | 2.64 | x |
| | M5 | 0.52 | 0.68 | 2.70 | 1.19 | x |
| | M6 | 0.50 | 0.67 | 2.45 | 0.95 | x |
| | M7 | 0.51 | 0.64 | 2.67 | 2.14 | x |
| | M8 | 0.44 | 0.74 | 0.88 | 1.40 | x |
| | M9 | 0.46 | 0.76 | 1.30 | 2.62 | x |
| | M10 | 0.48 | 0.87 | 1.61 | 3.01 | x |
| | Min | 0.42 | 0.64 | 0.88 | 0.95 | x |
| | Max | 0.57 | 0.87 | 3.02 | 3.01 | x |
| | Average | 0.48 | 0.73 | 2.24 | 1.90 | x |
| | StDev | 0.05 | 0.07 | 0.76 | 0.70 | x |

TABLE 5D

| Frequency Score (cut × tie = 0.5 mm × 0.15 mm) | | | | | |
|---|---|---|---|---|---|
| Laser Power Setting (%) | | 400 | 300 | 200 | 175 |
| Max Web Speed (ft/min) | | 492 | 656 | 984 | 1125 |
| Laser Frequency Tested (kHz) | | 0.78 | 0.78 | 0.78 | 0.78 |
| Max Freq. at Max Web Speed (kHz) | | 3.8 | 5.1 | 7.7 | 8.8 |
| Standard | M1 | 10.20 | 11.72 | 12.37 | 12.62 |
| Tensile | M2 | 9.87 | 11.70 | 12.31 | 12.29 |
| (lbs-f/in) | M3 | 9.78 | 11.82 | 12.35 | 12.50 |
| | M4 | 9.44 | 11.85 | 12.36 | 12.47 |
| | M5 | 9.22 | 11.72 | 12.34 | 12.62 |
| | M6 | 9.39 | 11.71 | 12.43 | 12.67 |
| | M7 | 9.81 | 11.38 | 12.32 | 12.41 |
| | M8 | 9.54 | 11.54 | 12.37 | 12.35 |
| | M9 | 10.25 | 11.44 | 12.38 | 12.58 |
| | M10 | 9.86 | 11.78 | 12.45 | 12.59 |
| | Min | 9.22 | 11.38 | 12.31 | 12.29 |
| | Max | 10.25 | 11.85 | 12.45 | 12.67 |
| | Average | 9.73 | 11.66 | 12.37 | 12.51 |
| | StDev | 0.34 | 0.16 | 0.05 | 0.13 |
| Tensile % of Raw Film | | 74.1 | 74.15 | 88.85 | 94.21 |
| Trouser | M1 | 0.20 | 0.48 | 1.74 | x |
| Tear | M2 | 0.21 | 0.49 | 2.13 | x |
| Tensile | M3 | 0.23 | 0.50 | 1.43 | x |
| (lbs-f) | M4 | 0.23 | 0.51 | 1.91 | x |
| | M5 | 0.21 | 1.33 | 1.79 | x |
| | M6 | 0.22 | 1.00 | 1.96 | x |
| | M7 | 0.20 | 0.45 | 2.15 | x |
| | M8 | 0.21 | 0.42 | 2.21 | x |
| | M9 | 0.21 | 0.43 | 2.24 | x |
| | M10 | 0.20 | 0.49 | 2.23 | x |
| | Min | 0.20 | 0.42 | 1.43 | x |
| | Max | 0.23 | 1.33 | 2.24 | x |
| | Average | 0.21 | 0.61 | 1.98 | x |
| | StDev | 0.01 | 0.30 | 0.27 | x |

TABLE 5E

| Frequency Score (cut × tie = 0.15 mm × 0.15 mm | | | | |
|---|---|---|---|---|
| Laser Power Setting (%) | 400 | 300 | 250 | 225 |
| Max Web Speed (ft/min) | 492 | 656 | 787 | 875 |
| Laser Frequency Tested (kHz) | 1.69 | 1.69 | 1.69 | 1.69 |
| Max Freq. at Max Web Speed (kHz) | 8.3 | 11.1 | 13.3 | 14.8 |

TABLE 5E-continued

| Frequency Score (cut × tie = 0.15 mm × 0.15 mm | | | | | |
|---|---|---|---|---|---|
| Standard Tensile (lbs-f/in) | M1 | 11.55 | 12.33 | 12.49 | 12.51 |
| | M2 | 11.48 | 12.58 | 12.53 | 12.29 |
| | M3 | 11.56 | 12.34 | 12.75 | 12.45 |
| | M4 | 11.71 | 12.44 | 12.53 | 12.55 |
| | M5 | 11.23 | 12.09 | 12.58 | 12.52 |
| | M6 | 11.41 | 12.22 | 12.40 | 12.49 |
| | M7 | 11.36 | 11.98 | 12.73 | 12.67 |
| | M8 | 10.98 | 12.25 | 12.43 | 12.55 |
| | M9 | 11.51 | 12.61 | 12.50 | 12.46 |
| | M10 | 11.70 | 12.34 | 12.35 | 12.59 |
| | Min | 10.98 | 11.98 | 12.35 | 12.29 |
| | Max | 11.71 | 12.61 | 12.75 | 12.67 |
| | Average | 11.45 | 12.32 | 12.53 | 12.51 |
| | StDev | 0.22 | 0.20 | 0.13 | 0.10 |
| Tensile % of Raw Film | | 87.2 | 87.22 | 93.83 | 95.44 |
| Trouser Tear Tensile (lbs-f) | M1 | 0.72 | 0.96 | 1.04 | 1.87 |
| | M2 | 0.84 | 1.21 | 2.97 | 1.39 |
| | M3 | 0.80 | 1.18 | 2.79 | 2.24 |
| | M4 | 0.73 | 1.08 | 2.71 | 1.50 |
| | M5 | 0.69 | 1.06 | 1.14 | 2.59 |
| | M6 | 0.79 | 0.91 | 0.93 | 1.58 |
| | M7 | 0.67 | 0.97 | 2.01 | 1.85 |
| | M8 | 0.67 | 1.02 | 1.29 | 1.06 |
| | M9 | 0.68 | 1.03 | 1.76 | 1.81 |
| | M10 | 0.69 | 1.04 | 1.31 | 1.29 |
| | Min | 0.67 | 0.91 | 0.93 | 1.06 |
| | Max | 0.84 | 1.21 | 2.97 | 2.59 |
| | Average | 0.73 | 1.05 | 1.79 | 1.72 |
| | StDev | 0.06 | 0.09 | 0.78 | 0.46 |

In the results above for TABLES 5A-5E, an "x" designates a failure in the test, such as the film not being able to tear along the score feature or tear at all, such as when the film stretches but doesn't tear. As can be appreciated from the results above, the comparative straight-line score of TABLE 5A tore well at higher laser powers (e.g., 300-400%) according to the trouser tear tensile results, but had very low and inconsistent standard tensile results which would cause issued with downstream converting or future manufacturing processes required of film which place the film under web tension. When laser power was decreased the standard tensile strength went up but resulted in segments of stretchiness and track off with the trouser tear, causing uncontrolled tearing that veered off of the score feature and poor end-user performance.

As shown in TABLE 5B, the cut×tie of 0.5 mm×0.5 mm did not tear at the 12 in/min that the test machine tears at via the trouser tear tensile test, but when torn quickly by hand was able to tear sufficiently. This is likely caused by tie lengths between each cut being too long and causing the tear propagation to track off from the score feature and stretch the film. However, the standard tensile strengths were sufficient for all settings for downstream converting needs.

As shown in TABLE 5C, the cut×tie of 0.3 mm×0.3 mm tore well at higher powers laser powers of 300 and 400% and had good or sufficient standard tensile values compatible with downstream converting processes. At lower laser powers the standard tensile values were sufficient but the film didn't tear well via the trouser tear tensile test, as also evidenced by the large standard deviation for that test, meaning the tear would get stuck at certain places along the score feature rather than tear consistently down the whole length of the score feature. Generally, the lower the standard deviation the more consistent and controlled the tear will be, such that the tear does not get hung up or stuck or otherwise veer away from the direction of the score feature.

As shown in TABLE 5D, the cut×tie of 0.5 mm×0.15 mm tore well at higher laser powers 300 and 400% and had standard tensile values that were sufficient, as well as good trouser tear results for those higher power settings, though the standard deviation was a bit high for the 300% power setting.

As shown in TABLE 5E, the cut×tie of 0.15 mm×0.15 mm tore well and with low standard deviation at higher laser powers of 300 and 400%, and had sufficient and good standard tensile values regardless of the power settings used.

It may also be appreciated that all the frequency scored films of TABLES 5B-5E were scored at very low frequencies ranging from about 0.5 to about 1.7 kHz, in contrast with the straight-line score of the comparative example in TABLE 5A processed at 40 kHz. As discussed previously, it was surprisingly discovered that such low frequencies, including below 20 kHz, could produce score features in recyclable films that were strong enough to meet standard tensile strength requirements at the same time as exhibiting good trouser tear performance. In other words, the recyclable films were successfully processed using the techniques of the present disclosure to produce films that exhibited both sufficient tensile strength for downstream converting applications as well as good tearability for end users. Films exhibiting sufficient standard tensile strength tended to have a tensile strength % of at least about 55% of a raw, unprocessed film prior to laser scoring, or alternatively having a tensile strength of above 10 lbs-f/in. Films exhibiting good end-user performance as measured by the trouser tear tensile method tended to have values between about 0.1 to about 1.0 lbs-f, and a standard deviation of about 0.01 to about 0.15 resulting in good, consistent tearing down the score features. Further, these score features on the recyclable films were processed at commercially feasible line speeds ranging from about 100 to about 700 ft/min.

While the invention has been described with reference to exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for laser scoring a film comprising at least 90% polyolefin, comprising:

scoring a moving web of the film by utilizing a peak pulse power of a $CO_2$ laser at a frequency of about 20 kHz or less to create a scored film with a score feature comprising a series of non-overlapping scored spots; moving the web of the film at a speed of 100 ft/min or greater; and controlling the $CO_2$ laser to have a power difference of at least about 135 watts between an average local maximum and average local minimum measured power.

2. The method of claim 1, wherein the series of non-overlapping scored spots have a cut size of between 0.15 mm and less than 0.5 mm, and a tie length between 0.15 mm and less than 0.5 mm.

3. The method of claim 1, wherein the series of non-overlapping scored spots have a cut size of between 0.15 mm and 0.5 mm, and a tie length between 0.15 mm and 0.3 mm.

4. The method of claim 1, wherein the scored film comprises a tensile strength of at least 55% of an original tensile strength of the film prior to laser scoring, or greater than 10 lbs-f/in, when measured by a Tensile Test Method.

5. The method of claim 1, wherein the scored film tears consistently along the score feature when subject to an average force of about 0.1 lbs-f to about 1.0 lbs-f when measured according to a Trouser Tear Tensile Method.

6. The method of claim 1, wherein the scored film tears consistently along the score feature when a standard deviation of at least 10 samples of film is between about 0.01 to about 0.15 when measured according to a Trouser Tear Tensile Method.

7. The method of claim 1, further comprising creating the score feature on the film in a crossweb direction.

8. The method of claim 1, further comprising creating the score feature on the film in a machine direction.

9. The method of claim 1, wherein the polyolefin comprises one or more polymers selected from the group consisting of polypropylene (PP), polyethylene (PE), high-density polyethylene (HDPE), low-density polyethylene (LDPE), linear low-density polyethylene (LLDPE), ethylene vinyl acetate (EVA), and polyethylene butene (PB).

10. The method of claim 1, wherein the polyolefin comprises one or more polymers selected from the group consisting of polyethylene (PE), high-density polyethylene (HDPE), low-density polyethylene (LDPE), and linear low-density polyethylene (LLDPE).

11. The method of claim 1, wherein the film is a multilayer film.

12. A method for laser scoring a film comprising at least 90% polyolefin, comprising:

scoring a continuously moving web of the film by utilizing a peak pulse power of a $CO_2$ laser at a frequency of about 15 kHz or less to create a scored film with a score feature comprising a series of non-overlapping scored spots; moving the web of the film at a speed of 100 ft/min or greater; and controlling the $CO_2$ laser to have a power difference of at least about 135 watts between an average local maximum and average local minimum measured power.

13. The method of claim 12, wherein the series of non-overlapping scored spots have a cut size of between 0.15 mm and less than 0.5 mm, and a tie length between 0.15 mm and less than 0.5 mm.

14. The method of claim 12, wherein the series of non-overlapping scored spots have a cut size of between 0.15 mm and 0.5 mm, and a tie length between 0.15 mm and 0.3 mm.

15. The method of claim 12, wherein the scored film comprises a tensile strength of at least 55% of an original tensile strength of the film prior to laser scoring, or greater than 10 lbs-f/in, when measured by a Tensile Test Method.

16. The method of claim 12, wherein the scored film tears consistently along the score feature when subject to an average force of about 0.1 lbs-f to about 1.0 lbs-f when measured according to a Trouser Tear Tensile Method.

17. The method of claim 12, wherein the scored film tears consistently along the score feature when a standard deviation of at least 10 samples of film is between about 0.01 to about 0.15 when measured according to a Trouser Tear Tensile Method.

* * * * *